Oct. 6, 1964    R. E. BUTCHER    3,151,869
FRAGILE LINED PIPE COUPLING AND GASKET THEREFOR
Filed Dec. 11, 1961

INVENTOR.
Richard E. Butcher
BY
ATTORNEY

United States Patent Office 3,151,869
Patented Oct. 6, 1964

3,151,869
FRAGILE LINED PIPE COUPLING AND
GASKET THEREFOR
Richard E. Butcher, Midland, Mich., assignor to The Dow Chemical Company, Midland, Mich., a corporation of Delaware
Filed Dec. 11, 1961, Ser. No. 158,485
1 Claim. (Cl. 277—209)

This invention relates generally to gaskets and, more particularly, to a novel gasket structure for sealing fragile surfaces where sealing forces must be minimized, such as with glass-lined pipes, valves and fittings.

Often in chemical installations steel pipe with glass-lining are essential for storing and transporting highly corrosive chemical materials. Where such pipes are abutted or otherwise joined with adjacent units, a gasketing seal is necessary which will prevent leaks, prevent fracture of the glass lining, and will resist the corrosive effects of the solutions contained therein.

When sections of glass-lined pipe are brought together, they generally have outwardly extending flanges providing radii which are also glass-lined, as described in more detail hereinafter. In the use of prior gaskets, the glass-lining of such sections often breaks near their radius corners due to the necessary pressure exerted on adjacent flanges to secure a satisfactory seal with such a gasket located therebetween. One such prior gasket is that formed of a polytetrafluoroethylene envelope having thin walls in which an asbestos filler is inserted. Because of the thin walls, holes often occur therein permitting the highly corrosive material contained in the pipes to deteriorate the filler and destroy the seal. Also, retightening of the flanges about the gasket is repeatedly required, often for a period of 2 or 3 days, before a constant force is maintainable between the gasket and the flanges to provide an effective seal for a long period. Since such glass-lined pipes, as commonly used, require insulating material therearound, this 2 or 3 day delay means that the jointure must be left open while the rest of the pipe is covered, the jointure to be covered in a second operation later. Furthermore, any off-center location of this gasket with respect to the mating flanges results in a failure of the seal.

Another prior device is a solid polytetrafluoroethylene gasket machined out in the center with an asbestos sealer inserted in the machined-out portion. This provides for a thicker and less flowable envelope wall which more ably prevents pinholes from forming. However, this gasket has all of the other failings of the previously above-described gasket.

Accordingly, it is an object of the present invention to provide effective novel gaskets for sealing fragile surfaces.

In accord with the above object, it is an object of the present invention to provide novel gaskets for use in joining abutting surfaces where seating forces must be minimized.

It is another object of the present invention to provide novel gaskets where sealing pressure need not be applied at or near flange radii of abutting sections of tubular members.

Still another object of the present invention is to provide novel gaskets which decrease the amount of retightening necessary to secure jointures between abutting sections of fragile-lined tubular members.

Another object of the present invention is to provide safer and more economical gaskets which prevent seal failure and resultant contamination.

A further object of the present invention is to provide novel gaskets which decrease the stress necessary to provide an effective seal between the gaskets and the radius corners of glass-lined tubular sections.

Another object of the present invention is to provide gaskets for abutting sections of fragile-lined pipe sections which can have insulating material wrapped therearound immediately after jointures are made.

Still another object of the present invention is to provide gaskets containing the above objects and advantages which can be effectively molded.

Another object of the present invention is to provide generally solid gaskets with protruding compressible ridges for minimum contact with fragile surfaces to provide maximum sealing with minimum force.

Accordingly, in the following detailed description of the invention other advantages and objects will become apparent, it being understood that the invention is not limited with respect thereto, in which.

Figure 1:
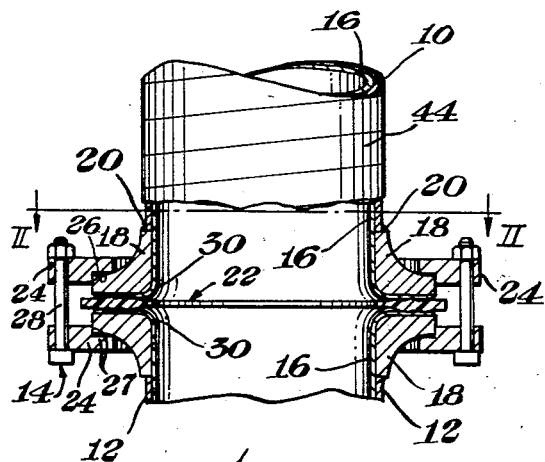
FIGURE 1 is a cross sectional view of a jointure incorporating a gasket constructed according to the principles of the present invention.
Figure 2:
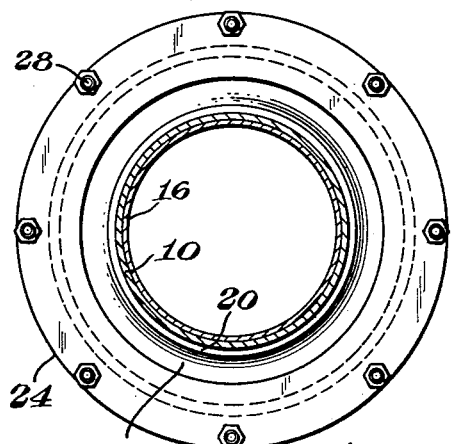
FIGURE 2 is a cross sectional view of FIGURE 1 taken generally along the reference line II—II thereof.

Referring more particularly to FIGURES 1 and 2, it can be seen that abutting sections 10 and 12 of glass-lined pipe are joined together by clamping arrangement 14. As stated previously, a glass-lining 16 is necessary for certain conduits so that they may carry highly corrosive chemicals and the like. It is therefore important that a jointure between abutting sections 10 and 12 be made with a sealing material which requires a minimum of force to effect the seal and yet be resistant to the corrosive effects of the chemical within the pipe sections 10 and 12. In one method of forming the structure as illustrated in FIGURE 1, a neck ring or corner flange 18 is welded, the weld being indicated by the reference numeral 20, to the exterior surface of each of the sections 10 and 12, so as to extend around the periphery thereof in an opposed relationship to one another. A glass-lining 16 is then formed along the inner surface of the pipe sections 10 and 12 and integrally around the opposed surfaces of the flanges 18. Such a glass-lining can be formed by any conventional method, as by firing or the like. The juxtaposed flanges 18 are brought into an engaged relation with a gasket 22 located therebetween. This gasket can be of a material such as polytetrafluoroethylene or some other similar material like a silicone rubber, for example. It is further understood that the solid body of the gasket could comprise a metal, like steel, or other similar rigid material, generally surrounded by a sufficient quantity of compressible material such as polytetrafluoroethylene.

Since the gasket is located in direct contact with the fragile glass surfaces 16 on the flanges 18, it is desirable that a minimum force be applied to provide an effective seal between the surfaces and the gasket. The clamping forces for this seal can be obtained by use of ring-type backing flanges 24 with have shoulders 26 for mating with the outer peripheral edges 27 of the flanges 18. The backing flanges 24 can be brought together so as to exert compressive forces on the gasket 22 through means of bolts 28 which can be tightened to provide the foot-pounds of torque pressure necessary. In the tests hereinafter discussed bolt-torque is the force measured in foot-pounds when using a torque wrench to tighten a bolt such as the bolt 28 of the clamping arrangement 14.

Failure of a jointure often occurs at the radii 30 of flanges 18. This necessitates the application of as little pressure as possible at the radii 30, thereby rendering it necessary to obtain as much of the sealing pressure on the gasket as possible at a point intermediate the radii 30 and the outer edges 27 of the flanges 18.

Figure 3:
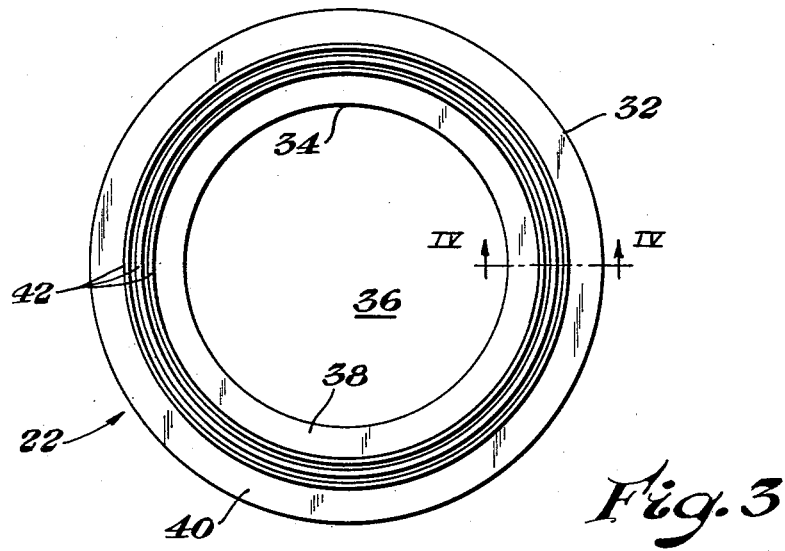
FIGURE 3 is a plan view of an individual gasket constructed according to the principles of the present invention.
Figure 4:
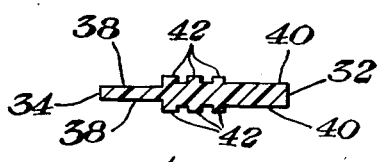
FIGURE 4 is a cross sectional view of the gasket of FIGURE 3 taken generally along the reference line IV—IV thereof.

A typical gasket 22 is illustrated in FIGURES 3 and 4. As stated previously, the gasket can be of any highly corrosive resistant material such as polytetrafluoroethylene, or silicone rubber, or other similar material having the compressibility to be used in a fragile application. However, a material like polytetrafluoroethylene, which is compressible yet has an elastic memory while still being somewhat cold flowable, is preferred.

Since the particular embodiment shown is that related to generally circular pipe sections, the gasket is of a like circular configuration, it being understood that if the pipe sections involved are other than circular the gasket would likewise be of a generally conforming shape. The gasket 22 thus presents an outer peripheral edge 32 and an inner peripheral edge 34 defined by an aperture 36 located generally centrally therein. Purposely the thickness of the edge 34 is relatively thinner than the edge 32, so that spaced generally planar or opposed inner surfaces 38 on each side of the edge 34 will exert only a minimum pressure against the critical radii 30 of the flanges 18. Thus, practically no force is exerted on the radii 30 when the gasket is compressed between the flanges 18 so as to cause fracture of the glass lining thereon.

Generally planar and spaced surfaces 40 on opposite sides of the edge 32 define a relatively thicker portion of the gasket, this portion including an intermediate portion having projecting ridges 42 extending outwardly from each side 40 of the gasket 22. It is understood, however, that neither opposed surfaces 38 or 40 need be exactly planar, but might be of varying configurations and still perform well because of the presence of ridges 42. These ridges 42 extend continuously around the circumference of the surface 40, and are of a width and height so as to stand firm and compress directly into the gasket rather than fold over when pressure from the clamping arrangement 14 is applied. One height requirement is, however, that there be enough to accommodate unevenness in the glass surface contacted by the gasket. Too much material in the ridge results also in excessive cold flowing of the plastic material and is to be avoided. The ridges 42 thus receive most of the effect of the bolt-torque pressure applied by the bolt 28 and the clamping flanges 24. It is well known that when the area of compression is reduced to a minimum that a smaller amount of force is necessary to obtain a given amount of pressure on that area. Thus, minimum clamping pressures can be used to obtain an effective seal on the ridges 42 than would be otherwise necessary on an elongated flat surface such as used in prior gaskets. It is precisely in this manner, by use of the ridges 42, that an effective seal pressure is maintainable between the glass-lined flanges 18 and the gasket 22 with a minimum of clamping force.

It can be seen from FIGURE 1 that as the ridges 42 are at least partly pressed into the body of the gasket ring 22, the body of the gasket 22 appears to become more dense in the area of the ridges. This more dense condition caused by the ridges and the action of the ridges themselves is the reason the gasket maintains a good seal with a light bolt-torque. Since a gasket of this type can be readily molded it has proved not only effective, but economical to use.

By using a gasket of this invention, retightening of the bolts is generally unnecessary. In using prior gaskets one had to first cover all of the pipe, except the jointure, with insulating material, and then come back later to insulate the jointure. By using a gasket of the present invention where no retightening is required, both the pipe and jointure can be covered with insulating material 44 (FIG. 1) in one operation, resulting in a substantial saving of time and effort.

The following example of a gasket made according to the principles of the present invention is to be considered as illustrative only and not as limiting the scope of the invention.

EXAMPLE

A gasket was tested, the gasket having an external diameter of approximately 4 inches with an internal diameter of approximately 2½ inches. The thicker outer edge of the gasket was approximately 3/32 of an inch while the thinner inside edge amounted to about 1/16 inch thickness. The distance from the internal edge to the first ridge, where the surfaces of the gasket are their thinnest to accommodate the radii of the corner flanges, was taken as approximately ¼ inch. The remaining width of the thicker wall portions amounted to approximately ¾ inch. Three spiral ridges of approximately 3/64 inch width and 1/64 inch height were spaced approximately 3/64 inch apart on each side of the gasket generally intermediate the edges thereof, starting at the interior end of the thinner section of the gasket. The effect of this particular ridge arrangement is not only to compensate for irregularities in the corner flange faces, but also to reduce the compressive area on the flange to approximately a 9/64 inch (the combined width of the three ridges) wide gasket. Of course, as noted previously, the gasket being thinner on the inside surface near the radii of the corner flanges results in alleviating the necessity of drawing the bolts tight enough to set up stresses to the point where failure of the fragile surface occurs.

A test was run on various gaskets, including one generally similar to that described in the example above, to try and determine when the prior gaskets failed and where the gasket of the present invention would continue to remain effective. A test assembly of glass-lined pipe was made up of different samples of gaskets, including those discussed previously as being prior to the present invention, and the test was run for a period of four days. The results of the test are as follows:

*First Day*

The following gaskets were assembled in glass-lined pipe sections with a bolt-torque of 60 foot-pounds and with an air pressure of 38 p.s.i. to test the seal:

Sample A—a red rubber gasket
Sample B—envelope gasket 1
Sample C—envelope gasket 2
Sample D—gasket constructed according to the principles of the present invention

*Second Day*

Upon testing, it was found that the air pressure had dropped to 10 p.s.i. and that the bolt-torque was as follows:

Sample A—50 foot-pounds
Sample B—50 foot-pounds
Sample C—50 foot-pounds
Sample D—60 foot-pounds The bolts were then retightened on Samples A, B and C to bring their bolt-torque back up to 60 foot-pounds and the air pressure was left undisturbed.

*Third Day*

The air pressure had dropped to 5 p.s.i. and the bolt-torque was found to be as follows:

Sample A—50 foot-pounds
Sample B—50 foot-pounds
Sample C—50 foot-pounds
Sample D—60 foot-pounds except at one bolt where it was 55 foot-pounds.

The bolts were again tightened to 60 foot-pounds. For a more severe test the assembly was connected to a 130 p.s.i steam supply for 3 hours. This introduces some heat shrink in the gasket material. After this, the steam pressure was shut off and the assembly cooled to room temperature. Then the steam supply was again turned back on and remained so until the fourth day.

*Fourth Day*

The steam pressure was released and the assembly was allowed to cool to room temperature. It was found that the bolt-torque was:

Sample A—10 foot-pounds
Sample B—30 foot-pounds
Sample C—30 foot-pounds
Sample D—50 foot-pounds It can readily be seen that the prior gaskets, Sample A, Sample B and Sample C, required constant retightening to maintain a bolt-torque of 60 foot-pounds throughout the first three days. In comparison it can be seen that a gasket of the present invention, Sample D, generally maintained the 60 foot-pound bolt-torque without retightening, with one minor exception on the third day.

A 130 p.s.i. steam pressure applied to the assembly provided a torturous test for the gaskets and it appears that only Sample D remained with a bolt-torque providing at least satisfactory force. As a matter of fact, even though a bolt-torque of between 50 and 60 foot-pounds is generally recommended to provide an effective seal, the gasket of the present invention has been found to provide an effective seal at as low as 30 foot-pounds bolt-torque. Such a low bolt-torque force did not maintain a satisfactory seal with the prior gaskets of Samples A, B and C, they requiring at least a 50 foot-pound bolt-torque.

While certain representative embodiments and details have been shown for the purpose of illustrating the invention, it will be apparent to those skilled in the art that various changes and modifications can be made therein without departing from the spirit and scope of the invention. For example, even though the gasket of this invention is primarily designed for use with fragile-lined tubular sections, it is conceivable that it can also be used with sections comprised completely of fragile material, such as glass and ceramic pipe sections.

What is claimed is:

A ring-shaped gasket formed of a material having substantially similar characteristics of compressibility and elastic memory and cold flowability and corrosive resistance as polytetrafluoroethylene, said gasket having an outer peripheral edge and a central aperture defining an inner peripheral edge, said gasket comprising a radially outer portion, an intermediate portion and a radially inner portion, said outer portion being defined by oppositely facing planar surfaces extending radially inwardly from said outer peripheral edge to said intermediate portion, said inner portion being defined by oppositely facing planar surfaces extending radially outwardly from said inner peripheral edge to said intermediate portion, said intermediate portion including at least one continuous ridge projecting axially from each of said oppositely facing surfaces thereof and beyond the planar surfaces of both said inner and outer portions, said outer and inner portions being so dimensioned that when a compressive axial load is placed upon the gasket said outer and inner portions resist substantial cold flow of said intermediate portion and its included ridges, said inner portion being thinner than the intermediate and outer portions of said gasket whereby this thinnest portion of said gasket serves to alleviate pressures on fragile lined surfaces which may be juxtaposed thereto.

References Cited in the file of this patent

UNITED STATES PATENTS

| | | |
|---|---|---|
| 612,394 | Bernardi | Oct. 18, 1898 |
| 1,731,404 | Wetherill | Oct. 15, 1929 |
| 2,456,262 | Fields | Dec. 14, 1948 |
| 2,543,963 | Gaffin | Mar. 6, 1951 |
| 2,606,574 | Lefebvre | Aug. 12, 1952 |
| 2,789,844 | Kessler | Apr. 23, 1957 |
| 2,867,463 | Snider | Jan. 6, 1959 |
| 2,887,331 | Johnson | May 19, 1959 |
| 2,919,936 | Hurley | Jan. 5, 1960 |

FOREIGN PATENTS

| | | |
|---|---|---|
| 557,334 | Belgium | May 31, 1957 |
| 248,920 | Great Britain | Mar. 18, 1926 |
| 6,800 | France | Jan. 14, 1907 |